(12) United States Patent
Otway et al.

(10) Patent No.: US 7,020,773 B1
(45) Date of Patent: Mar. 28, 2006

(54) STRONG MUTUAL AUTHENTICATION OF DEVICES

(75) Inventors: David John Otway, Cambridge (GB); John Albert Bull, Great Brington (GB)

(73) Assignee: Citrix Systems, Inc., Fort Lauderdale, FL (US)

( * ) Notice: Subject to any disclaimer, the term of this patent is extended or adjusted under 35 U.S.C. 154(b) by 858 days.

(21) Appl. No.: 09/617,380

(22) Filed: Jul. 17, 2000

(51) Int. Cl.
*H04L 9/12* (2006.01)

(52) U.S. Cl. ............... 713/171; 380/278; 380/283; 713/155; 713/168; 713/169

(58) Field of Classification Search ............... 713/155, 713/156, 169, 171, 168; 380/178
See application file for complete search history.

(56) References Cited

U.S. PATENT DOCUMENTS

| | | | |
|---|---|---|---|
| 4,649,410 A | 3/1987 | Ohashi | |
| 4,807,029 A | 2/1989 | Tanaka | |
| 4,887,204 A | 12/1989 | Johnson et al. | |
| 4,924,378 A | 5/1990 | Hershey et al. | ............ 364/200 |
| 4,937,784 A | 6/1990 | Masai et al. | |
| 5,014,221 A | 5/1991 | Mogul | |
| 5,161,015 A | 11/1992 | Citta et al. | |
| 5,164,727 A | 11/1992 | Zakhor et al. | |
| 5,175,852 A | 12/1992 | Johnson et al. | |
| 5,202,971 A | 4/1993 | Henson et al. | |
| 5,204,897 A | 4/1993 | Wyman | .......................... 380/4 |
| 5,229,864 A | 7/1993 | Moronaga et al. | |
| 5,305,440 A | 4/1994 | Morgan et al. | |
| 5,325,527 A | 6/1994 | Cwikowski et al. | |
| 5,329,619 A | 7/1994 | Page et al. | |
| 5,341,477 A | 8/1994 | Pitkin et al. | |
| 5,341,478 A | 8/1994 | Travis, Jr. et al. | |
| 5,351,293 A | 9/1994 | Michener et al. | |
| 5,359,721 A | 10/1994 | Kempf et al. | ............ 395/425 |
| 5,367,688 A | 11/1994 | Croll | |
| 5,390,297 A | 2/1995 | Barber et al. | ............ 395/200 |
| 5,400,403 A * | 3/1995 | Fahn et al. | ................. 705/51 |
| 5,412,717 A | 5/1995 | Fischer | ........................ 380/4 |
| 5,440,635 A * | 8/1995 | Bellovin et al. | ............ 713/171 |

(Continued)

FOREIGN PATENT DOCUMENTS

EP  0 643 514 A2  3/1995

(Continued)

OTHER PUBLICATIONS

Schneier, "Applied Cryptography," 1996, p. 48.*

(Continued)

*Primary Examiner*—Gregory Morse
*Assistant Examiner*—Matthew Heneghan
(74) *Attorney, Agent, or Firm*—Choate, Hall & Stewart; John D. Lanza

(57) ABSTRACT

The present invention relates to a method for enabling strong mutual authentication between two computers in a communication system. A user from a client attempts to gain access to a server. The server transmits a first key encrypted by a second key to the client and a second key encrypted by a user's private key to a verifier. The verifier uses the user's login information to obtain the user's private key, which the verifier uses to obtain the second key. The verifier transmits the second key to the client and the client decrypts the first key with the second key. The client then transmits the second key encrypted by the first key to the server. If the received second key is the same as the generated second key, the client is authenticated to the server.

47 Claims, 1 Drawing Sheet

U.S. PATENT DOCUMENTS

| | | | |
|---|---|---|---|
| 5,440,719 A | 8/1995 | Hanes et al. | |
| 5,455,953 A | 10/1995 | Russell | 395/739 |
| 5,475,757 A | 12/1995 | Kelly | |
| 5,491,750 A | 2/1996 | Bellare et al. | 380/21 |
| 5,504,814 A | 4/1996 | Miyahara | 380/4 |
| 5,509,070 A | 4/1996 | Schull | 380/4 |
| 5,515,508 A | 5/1996 | Pettus et al. | |
| 5,524,238 A | 6/1996 | Miller et al. | 395/600 |
| 5,544,246 A | 8/1996 | Mandelbaum et al. | 380/23 |
| 5,550,976 A | 8/1996 | Henderson et al. | 395/200.06 |
| 5,550,981 A | 8/1996 | Bauer et al. | 395/200.06 |
| 5,553,139 A * | 9/1996 | Ross et al. | 705/59 |
| 5,553,143 A * | 9/1996 | Ross et al. | 705/59 |
| 5,553,145 A * | 9/1996 | Micali | 380/30 |
| 5,557,732 A | 9/1996 | Thompson | 395/161 |
| 5,564,016 A | 10/1996 | Korenshtein | 395/186 |
| 5,583,992 A | 12/1996 | Kudo | |
| 5,592,549 A | 1/1997 | Nagel et al. | 380/4 |
| 5,604,490 A | 2/1997 | Blakley, III et al. | 340/825.31 |
| 5,638,513 A | 6/1997 | Ananda | 395/188.01 |
| 5,657,390 A | 8/1997 | Elgamal et al. | 380/49 |
| 5,668,876 A | 9/1997 | Falk et al. | |
| 5,668,999 A | 9/1997 | Gosling | 395/704 |
| 5,671,354 A | 9/1997 | Ito et al. | |
| 5,689,708 A | 11/1997 | Regnier et al. | 395/682 |
| 5,729,734 A | 3/1998 | Parker et al. | 395/609 |
| 5,737,416 A | 4/1998 | Cooper et al. | 380/4 |
| 5,742,757 A | 4/1998 | Hamadani et al. | 395/186 |
| 5,787,169 A | 7/1998 | Eldridge et al. | |
| 5,794,207 A | 8/1998 | Walker et al. | 705/23 |
| 5,881,226 A | 3/1999 | Veneklase | |
| 5,956,407 A | 9/1999 | Slavin | 380/30 |
| 6,035,405 A | 3/2000 | Gage et al. | |
| 6,078,908 A | 6/2000 | Schmitz | |
| 6,088,450 A | 7/2000 | Davis et al. | |
| 6,128,742 A | 10/2000 | Felt | |
| 6,131,116 A | 10/2000 | Riggins et al. | |
| 6,178,508 B1 | 1/2001 | Kaufman | |
| 6,226,383 B1 | 5/2001 | Jablon | |
| 6,286,104 B1 | 9/2001 | Buhle et al. | |
| 6,289,461 B1 | 9/2001 | Dixon | |
| 6,609,206 B1 | 8/2003 | Veneklase | |
| 6,757,825 B1 | 6/2004 | MacKenzie et al. | |
| 2001/0056547 A1 | 12/2001 | Dixon | |

FOREIGN PATENT DOCUMENTS

| | | |
|---|---|---|
| EP | 0 679 980 A1 | 11/1995 |
| EP | 0 734 144 A2 | 9/1996 |
| EP | 0 851 628 A1 | 7/1998 |
| EP | 0 875 871 A2 | 11/1998 |
| GB | 2 168 831 A | 6/1986 |
| NL | 1007409 | 11/1997 |
| WO | WO 93/15457 A1 | 8/1993 |
| WO | WO 94/28670 A1 | 12/1994 |
| WO | 97/18635 | 5/1997 |
| WO | WO 98/52344 A1 | 11/1998 |

OTHER PUBLICATIONS

"Network Neighborhood", http://www.internet.com, © 1999 internet.com.

Howard Millman, "Give Your Computer the Finger" Computerworld, Mar. 27, 2000.

B. Clifford Neuman, "Proxy-Based Athorization and Accounting for Distributed Systems", © IEEE, May 25, 1993, pp. 283-291.

Win95 Tutorial: Indes of Topics, http://orion.valencia.fl.us/tutorials/Win95demo/net.html, printed Dec. 27, 1999 (2 pages).

"IBM: IBM Operating System/2 Version 1.2 Profile Validation Hooks", pp. 1-26, Nov. 22, 1989.

N.F. Maxemchuk, S. Low, "The Use of Communications Networks to Increase Personal Privacy" from *IEEE INFOCOM' 95*, Proceedings, vol. 2, Apr. 2-6, 1995, pp. 504-512.

P.Y.A. Ryan, S.A. Schneider, "An attack on a recursive authentication protocol A cautionary tale" *Information Processing Letters 65*, 1998 Elsevier Science B.V., pp. 7-10.

Dave Otway and Owen Rees, "Efficient and Timely Mutual Authentication", The ANSA Project, 24 Hills Road, Cambridge CB21JP United Kingdom, pp. 8-10.

Lawrence C. Paulson, "Mechanized Proofs for a Recursive Authentication Protocol" Computer Laboratory, University of Cambridge, Pembroke Street, Cambridge CB2 3QG, England, pp. 84-94.

Li Gong, "Using One-Way Functions for Authentication" University of Cambridge Computer Laboratory, Cambridge CB2 3QG, England, Jul. 1989, pp. 8-11.

Tony Savvas, "Handset Giants Launch Security System" www.computerweekly.com.

Charles Seife, "Algorithmic Gladiators Vie For Digital Glory" www.sciencemag.org, Science, vol. 288, May 19, 2000, pp. 1161 & 1163.

Russell Kay, "Authentication" Computerworld, Mar. 27, 2000, pp. 77-79.

Tom Yager, "OS Paradise" BYTE, Nov., 1995.

Bridget Allison, Robert Hawley, Andrea Borr, Mark Muhlestein, David Hitz, "File System Security: Secure Network Data Sharing For NT and UNIX" Network Appliance, Inc., Tech Library, Jan. 16, 1998 pp. 1-16 (double sided).

Keung et al "Efficient Protocols Secure Against Guessing and Replay Attacks," *IEEE*, 1995, 105-12.

Totty, P "Slaying one step ahead of the hackers," *Credit Union Magazine*, 2001; 39-41.

Jeong, et al. "Mutual Authentication Protocols for the Virtual Home Environment in 3G Mobile Network," *IEEE*. 2002; 1658-62.

Shieh, et al. "An Authentication Protocol Without Trusted Third Party," *IEEE*. 1997; 87-89.

* cited by examiner

STRONG MUTUAL AUTHENTICATION OF DEVICES

FIELD OF THE INVENTION

The invention relates in general to secure communication systems and more specifically systems enabling mutual authentication of devices.

BACKGROUND OF THE INVENTION

When dealing with electronic commerce, security of information on a network is a problem faced by individuals and companies alike. For example, the security today between a user's computer and server computer in an electronic transaction does not preclude the user from fraudulently quoting another user's identification information, such as a user's password, credit card number, or social security number. Likewise, a server could similarly be fraudulently represented on the user's computer by someone to obtain the unsuspecting user's information. Therefore, in business transactions occurring over the internet today, full electronic commerce necessitates stronger authentication between the user's computer and the server computer.

For stronger authentication of both users and server computers, encryption and decryption may be used for the transmission of messages. The major barrier to mutual authentication of a user's computer communicating with a server computer is the inability of personal computers to provide tamperproof and confidential storage for these keys, which are vital for security of transmitted information. Smart cards, or credit-card sized devices that have user information embedded within the card, have recently addressed this issue. However, the smart cards are only as useful as the number of smart card readers available, which currently have not been widely adopted.

Therefore, it is desirable to produce an equivalent but unrestricted method to allow strong mutual authentication between devices.

SUMMARY OF THE INVENTION

The invention relates to a method for enabling strong mutual authentication between two computers or devices in a communication system. In one embodiment, the communication system includes a first computer in communication with a second computer. A user attempting to gain access to the first computer transmits login information via a second computer over a first communication channel to the first computer. The first computer transmits a first message, which in one embodiment includes a first key encrypted by a second key, to the second computer over the first communication channel. The second computer does not have access to the second key, and so cannot decrypt the first message to obtain the first key.

The first computer then transmits a second message to a third device associated with the user over a second communication channel. The second message includes the second key that the second computer needs to decrypt the first message transmitted by the first computer. In one embodiment the second key included in the second message is encrypted with a public key associated with the user. The second message in one embodiment also includes the user's login information. The third device, in one embodiment, uses the user's login information to obtain the private key associated with the user, which the third device uses to obtain the second key.

The third device transmits the second key in a third message to the second computer over a third communication channel. The second computer uses the thereby attained second key to decrypt the first message and obtain the first key.

Once the second computer obtains the first key, in one embodiment the second computer switches the role of the keys from the first message by encrypting the second key with the first key into a fourth message. The second computer transmits the fourth message to the server over the first communication channel, and the first computer subsequently decrypts the fourth message using its first key. If the second key received from the fourth message is the same as the second key used in the first message, then the second computer is authenticated to the first computer.

DESCRIPTION OF THE DRAWINGS

The aspects of the invention presented above and many of the accompanying advantages of the present invention will become better understood by referring to the included drawings, which show a system according to the preferred embodiment of the invention and in which.

DESCRIPTION OF THE PREFERRED EMBODIMENTS

Figure 1:
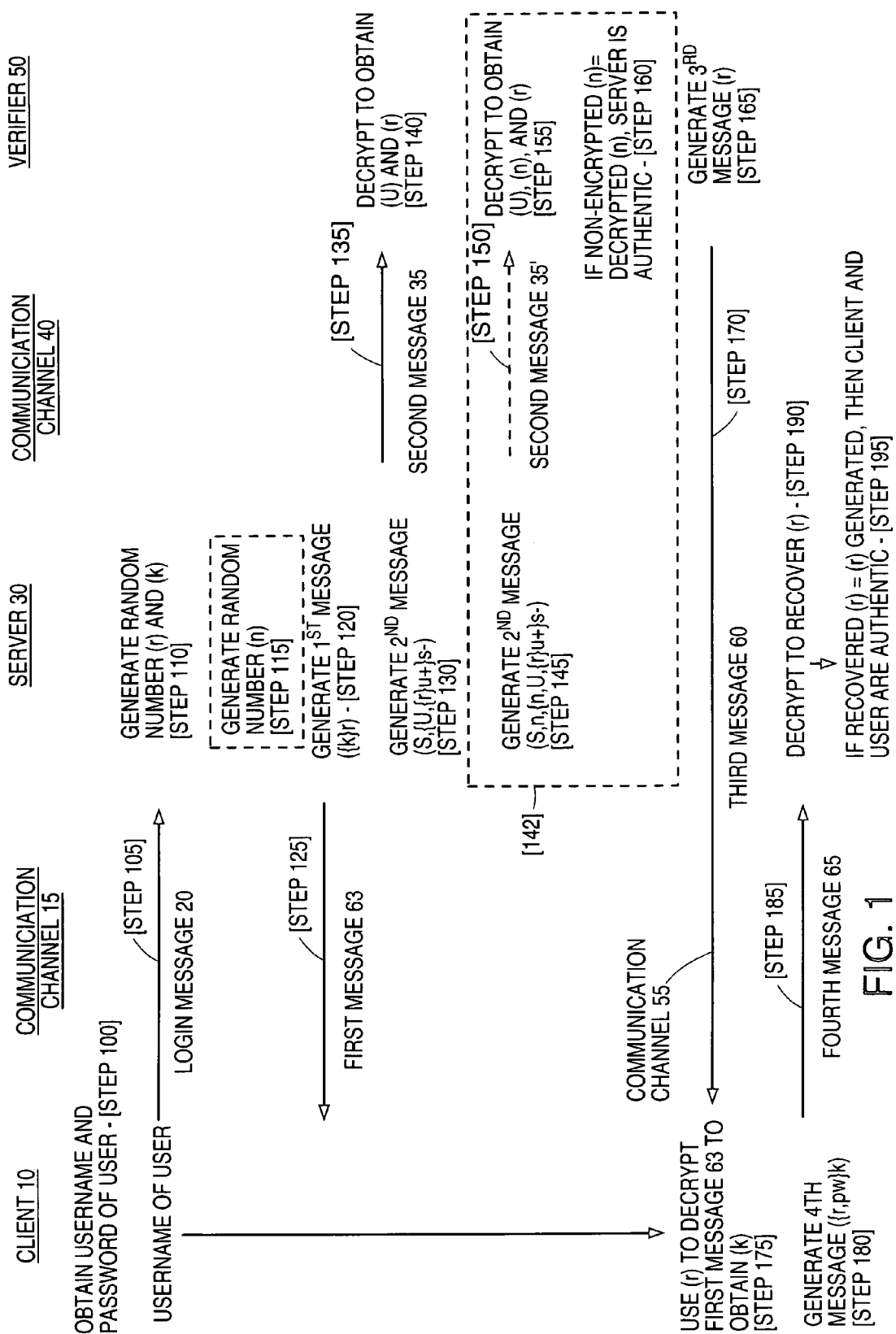
FIG. 1 is a diagram of the steps and protocol followed in an embodiment of the communications system of this invention to mutually authenticate the user and components of the communications system.

In brief overview, the present invention relates to a method for enabling strong mutual authentication between a first computer or device and a second computer or device which are in communication. Referring to FIG. 1, the first computer 30, also referred to as a server (S), communicates with the second computer 10, also referred to as a client (C), over a communication channel 15. The client (C) 10 begins the authentication routine by transmitting (step 105) information about a user (U) who is attempting to gain access to the server (S) 30 by way of the client (C) 10. The server (S) 30 transmits (step 125) a first message ({k}r) 63, which, in one embodiment, includes a first key (k) encrypted with a second key (r), to the client (C) 10. In one embodiment the first key (k) is a session key and is used only to authenticate communications between the server (S) 30 and the client (C) 10.

Authentication of the client (C) 10 to the server (S) 30 will occur when the client (C) 10 transmits a message back to the server (S) 30 which includes the second key (k). In one embodiment the message is the second key (r) encrypted with the first key (k). In order for the client (C) 10 to send the second key (r) back to the server (S) 30 or to send the second key (r) encrypted with the first key (k) back to the server (S) 30, it must first decrypt the first message ({k}r) 63 to obtain the first key (k). However, to decrypt the first message ({k}r) 63 the client 10 needs the second key (r), which it does not have access to in its memory.

To provide the client (C) 10 with the second key (r), the server (S) 30 begins by transmitting (step 135) a second message 35 to a third device, or verifier 50 associated with the user (U). In one embodiment the verifier 50 is a telephone associated with the user (U). In one embodiment, the second message 35 includes an encrypted portion, which includes the second key (r) encrypted with a third key (u+) (that is: ({r}u+)), and encryption key information. In one embodiment, the encryption key information is the user's information, such as the user's username and is also designated by (U). In one embodiment, the second key (r) encrypted with the third key (u+) and the encryption key information (U) are all encrypted with a fourth key (s−) (that is: ({U,{r}u+}s−)). In one embodiment the third key (u+) is the user's public key and the fourth key (s−) is the server's private key. The second message 35 also includes a non-encrypted portion, which indicates what key is to be used to decrypt the second message 35. In one embodiment the non-encrypted portion includes the designation (S) of the server (S) 30. Thus, the second message 35 may be written as (S,{U,{r}u+}s−).

When the verifier 50 receives the second message 35, it is able to read the non-encrypted portion and extract the server designation (S) to determine what key is to be used in decrypting the second message 35. By reading the server designation (S), the verifier 50 knows that the key (s−) was used to encrypt the encrypted portion of the second message 35 and can thereby decrypt it (step 140). In the embodiment in which (s−) is the server's private key, the designator (S) indicates to the verifier 50 that the server's public key (s+) should be used to decrypt the message. From this decryption the verifier 50 is able to obtain encryption key information about the user (U) and from this information determine that the third key (u+) was used to encrypt the second key (r). In the embodiment in which the user's public key (u+) was used to encrypt the message, the designator (U) instructs the verifier 50 to use the user's private key (u−) which in one embodiment is stored on the verifier 50, to decrypt the message. From this information the verifier 50 can determine (r).

The verifier 50 subsequently transmits (step 170) the second key (r) in the third message 60 to the client (C) 10 over a communication channel 55. In one embodiment the communication channel 55 is the user (U), who simply reads the second key (r) from the display on the verifier 50 and enters it into the client (C) 10. With the newly received second key (r), the client (C) 10 can decrypt (step 175) the first message ({k}r) 63 received from the server (S) 30 to obtain the first key (k). The client (C) 10, in one embodiment, then encrypts (step 180) the second key (r) with the first key (k) to generate a fourth message ({r}k) 65. The client (C) 10 then sends (step 185) the fourth message ({r}k) 65 over the communication channel 15 to the server (S) 30.

The first computer (S) 30 next decrypts (step 190) this fourth message ({r}k) 65 using its first key (k) to obtain the second key (r). If the second key (r) received from the fourth message ({r}k) 65 is identical to the second key (r) which the server (S) 30 used to encrypt the first message ({k}r) 63, then the client (C) 10 is authenticated (step 195) to the server (S) 30. Thus the combination of multiple keys and multiple devices increases the amount of security in the authentication scheme.

In greater detail, when the user (U) logs onto the client (C) 10, he or she typically enters his or her username (U) and password (pw) (step 100). The client (C) 10 transmits (step 105) the user's username (U) as a login message 20 to the server (S) 30 over the communication channel 15, which in one embodiment may be a secure confidential communication channel. Once this login message 20 is received by the server (S) 30, the server (S) 30 generates (step 110) the first key (k) and the second key (r), which in one embodiment are random numbers. The server (S) 30 encrypts (step 120) this first key (k) with the second key (r) and transmits (step 125) the first message 63 ({k}r) to the client (C) 10 over the communication channel 15. Although in this embodiment the first key and the second key are random numbers that the server (S) 30 generates, in another embodiment such first and second keys may have predefined values. The first key (k) and a second key (r) may take on any specific values that the server (S) 30 expects to receive back from the client (C) 10 upon authentication as described below.

In one embodiment, the server (S) 30 uses the user's username (U) from the login message 20 to look up a public key (u+) associated with the user (U) and to define a method to communicate with the verifier 50 associated with the user (U). In one embodiment the method includes selecting the communication channel 40, which, in one embodiment, may be the user's mobile phone number. The server (S) 30 then generates (step 130) a second message 35, which may be designated as (S, {U,{r}u+}s−). The server (S) 30 transmits (step 135) the second message 35 to the verifier 50 over the communication channel 40, which in one embodiment may be a secure confidential communication channel.

As indicated previously, in one embodiment this second message 35 includes an encrypted portion and a non-encrypted portion. In one embodiment the encrypted portion includes the second key (r) encrypted with the user's public key (u+). The encrypted portion also includes the user's username (U) and the second key encrypted with the user's public key (u+), both encrypted with a private key (s−) associated with the server (S) 30. As a result of the encryption, the encrypted portion may be designated ({U,{r}u+}s−). The non-encrypted portion of the second message 35 includes the server 30 designation (S). As a result, the second message 35 may be designated as (S,{U,{r}u+}s−).

The verifier 50 receives the second message 35 (S,{U,{r}u+}s−) over the communication channel 40 and uses the non-encrypted server 30 designation (S) to obtain the server 30's public key (s+) from the verifier 50's memory. Using this public key (s+), the verifier 50 decrypts the encrypted part ({U,{r}u+}s−) of the second message 35 to obtain the user's username (U) (step 140) and the second key encrypted with the user's public key ({r}u+). With this information about the user (U), the verifier 50 obtains the user's private key (u−) from its memory in order to access the second key (r), which was encrypted with the user's public key (u+). In one embodiment, the verifier 50 can only access the user's private key (u−) encrypted with the user's password (w). The use of the separate user password (w) by the verifier 50 is to prevent the vital second key (r) from being reported to an unauthorized user. In one embodiment, the verifier 50 reports the user's username (U) on the mobile phone display and subsequently requests the matching user password (w). The user types in his or her password for the mobile phone and the phone decrypts ({u−}w) using the password (w) to obtain the user's private key (u−). With the user's private key (u−), the verifier 50 recovers (step 140) the second key (r) by decrypting ({r}u+), which was transmitted as part of the second message 35.

In another embodiment, the verifier 50 authenticates the server (S) 30 and thereby ensures the validity of the received second message 35 (as shown in phantom 142 in FIG. 1). For this to occur, the server (S) 30 generates (step 115) a third key (n), which in one embodiment is another random number, and includes this in the non-encrypted portion and encrypted portion of a second message 35' (step 145). That is, the encrypted portion may be designated as ({n, U, {r}u+}s−). The second message 35' may then be designated as (S, n, {n,U,{r}u+}s−). The server (S) 30, as before, transmits (step 150) this second message 35' to the verifier 50 over the communication channel 40. Again the verifier 50 decrypts (step 155) the encrypted portion ({n,U, {r}u+}s−) to obtain (U) and the third key (n).

The verifier 50 then checks (step 160) that the decrypted third key (n) is the same as the third key (n) sent in the non-encrypted portion of the message, thereby determining that the second message 35' was sent by the server (S) 30. Further, since the third key (n) in the non-encrypted portion should match the third key (n) in the encrypted portion of the second message 35", if the second message 35' was intercepted and a new third key (n) was inserted in the non-encrypted portion of the second message 35' to form a second message 35", the verifier 50 would detect the second message 35" as unauthentic. Therefore, the third key (n) allows the verifier 50 to assure that both the encrypted portion ({n, U, {r}u+}s−) and the non-encrypted portion (S,n) of the second message 35' are current messages. The verifier 50 then decrypts (step 155) the remainder of the encrypted portion ({r}u+) using the private key (u−) of user (U), which the verifier 50 has in its memory, to obtain the second key (r).

Subsequent to the recovery of the second key (r), the verifier 50 transmits (step 170) the second key (r) to the client (C) 10 in a third message 60 (step 165). The third message 60 is sent (step 170) over a communication channel 55, which may be a secure confidential communication channel. In one embodiment, the second key (r) recovered by the verifier 50 is produced on the mobile cellular phone display. The user (U) reads the second key (r) and types this second key (r) as message 60 into the client (C) 10. Thus in this embodiment the third message 60 is that displayed on the verifier, and the user (U) acts as the secure channel 55 carrying the third message 60 from the display of the verifier 50 to the client computer (C) 10. In another embodiment, the verifier 50 transmits the third message 60 over a direct electronic, radio, or optical communication channel 55 to the client (C) 10.

In one embodiment, the verifier 50 has a subscriber identification module (SIM) card, which is a smart card plugged into the mobile phone. The SIM allows the verifier 50 to store data in a tamperproof storage, access a private key associated with a particular user, decrypt the second message using the private key, and display a portion of the decrypted second message. In yet another embodiment, the verifier 50 has equivalent smart card properties.

In one embodiment, the client (C) 10 uses the desired second key (r) received in the third message 60 to recover (step 175) the first key (k) from the first message 63 ({k}r). The second key (r) and the user's login password (pw) are then encrypted (step 180) with the first key (k) and transmitted (step 185) to the server (S) 30 in a fourth message 65 ({r,pw} k) over the communication channel 15. The server (S) 30 decrypts (step 190) the fourth message 65 and authenticates (step 195) the user and client (C) 10 to the server (S) 30 if the returned second key (r) agrees with the second key (r) used in the first message 63 ({k}r). The server (S) 30 also authenticates the user with the decrypted user login password (pw).

In another embodiment, the server (S) 30 starts a timeout period when the server (S) 30 transmits (step 135) the second message 35 to the verifier 50. Authentication of the client (C) 10 to the server (S) 30 will only occur if the fourth message 65 ({r,pw}k) is received within the timeout period and the second key (r) from the fourth message 65 is the same as the generated second key (r).

In another embodiment, the phone has full screen and keyboard functionality from an electronic, radio, or optical communication channel 40 to the server (S) 30. In yet another embodiment, the verifier 50 can be repeatedly challenged by the server (S) 30 via the client (C) 10 using the first and third communication channels 15 and 55, respectively, to encrypt a random number with the user's private key (u−) to guarantee proximity between the verifier 50 and the client (C) 10. If the verifier 50 is removed, the secure link between the verifier 50 and the server (S) 30 is broken. Furthermore, if the verifier 50 is later brought back into the proximity of the client (C) 10, the secure link is automatically restored with the repeated challenges.

In one embodiment, the level of security obtained from the encryption technique used in the second message 35 increases as the number of devices, users, keys, and servers increase. Each encryption message can build from a previous encryption message to increase security. Some levels of security associated with different encryption messages are shown in the table below.

| User Authentication | Multiple Users per Phone | Server Authentication | Multiple Servers per Phone | Message Number | Message |
|---|---|---|---|---|---|
| Secret key | No | None | No | 1 | {r}u |
| Public key | No | None | No | 2 | {r}u+ |
| Public key | Yes | None | No | 3 | U{r}u+ |
| Public key | Yes | Secret key | No | 4 | {U{r}u+}s |
| Public key | Yes | Private key | No | 5 | {U{r}u+}s− |
| Public key | Yes | Private key | Yes | 6 | S{U{r}u+}s− |
| Public key | Yes | Private key plus encrypted random number | Yes | 7 | S,n{n,U{r}u+}s− |

A first message ({r}u) attains a level of authentication for one user per phone using a symmetric secret key (u) associated with the user and known by both the server (S) 30 and the verifier 50. A second message attains a greater level of security by encrypting the second key (r) with a public key (u+) associated with the user where the corresponding private key (u−) is known only by the verifier 50. A third message (U{r}u+) allows for multiple users in a communication system by including in the message a username (U) associated with each user to determine what key to use for which user.

A single server can be authenticated with a fourth message that adds to the third message a symmetric secret key (s) associated with the single server. By replacing the symmetric secret key (s) with a private key (s−), a greater level of security is achieved because the private key (s−) has to be stored only on the server. A sixth message permits authentication of multiple servers included in a communication system with the addition of a server name (S) to the fifth message. The addition of this server name (S) allows one server to be authenticated from the multiple servers in the system. Further, a sixth key (n) is added to the sixth message to authenticate the message itself and to ensure that the message is current. Similarly, encryption messages can be built up further and further to achieve greater and greater levels of security.

In another embodiment, the verifier 50 does not store private keys but still enables the same level of mutual authentication between the server (S) 30 and the client (C) 10. Rather than storing private keys, the verifier 50 communicates with a trusted authentication server to certify messages. For example, after the verifier 50 receives the second message 35 (S, {U, {r}u+}s-), the verifier 50 still obtains the correct public key (s+) from the verifier 50's memory. Using this public key (s+), the verifier 50 decrypts the encrypted portion ({U,{r}u+}s-) of the second message 35 to obtain the user's username (U) and the second key encrypted with the user's public key ({r}u+).

To use the user's private key (u-), which is needed to access the second key (r), the verifier 50 sends the encrypted portion of the second message 35 to a trusted server (T). The trusted server (T) is a server that both the server (S) 30 and the verifier 50 trust and recognize as secure. In one embodiment the verifier 50 communicates with the trusted server (T) over a secure confidential communication channel. The trusted server (T) uses the username (U) to look up the user's private key (u-) and uses it to decrypt {r}u-. The trusted server (T) then transmits the second key (r) back to the verifier 50.

In yet another embodiment, the verifier 50 does not store public or private keys. As described above, the needed private keys are accessed by way of the trusted server (T). In a similar manner, the verifier 50 can obtain the needed public keys by way of the trusted server (T). Thus in this embodiment the verifier 50 can provide strong mutual authentication between the client (C) 10 and the server (S) 30 without memory, smart card properties, or direct access to keys.

It will be appreciated that the embodiments described above are merely examples of the invention and that other embodiments incorporating variations therein are considered to fall within the scope of the invention. In view of the foregoing,

What we claim is:

1. A method for enabling strong mutual authentication on a computer network comprising the steps of:
    transmitting a first indicia of a user to a first computer over a first communication channel; generating by said first computer a first authentication number, a second authentication number, and a third authentication number;
    transmitting by said first computer a first message to a second computer, wherein said first message comprises said first authentication number encrypted by said second authentication number;
    transmitting by said first computer a second message to a verifier over a second communication channel, wherein said second message comprises said second authentication number encrypted and said third authentication number;
    decrypting by said verifier said second message to obtain a first decrypted message, wherein said first decrypted message comprises said second authentication number;
    transmitting by said verifier said second authentication number to said second computer over a third communication channel;
    decrypting by said second computer said first message transmitted by said first computer to recover said first authentication number;
    transmitting by said second computer a third message to said first computer over said first communication channel, wherein said third message comprises said second authentication number encrypted by said first authentication number; and
    validating said second computer by said first computer by decrypting said third message to obtain said second authentication number.

2. The method of claim 1, wherein said first authentication number is a session number.

3. The method of claim 1, wherein said first indicia is login information of said user for said first computer.

4. The method of claim 1, wherein said second authentication number is a random number.

5. The method of claim 1, wherein said third authentication number is a random number.

6. The method of claim 1, wherein said first message further comprises said first authentication number encrypted with said second authentication number.

7. The method of claim 1, wherein said second message further comprises an encrypted portion.

8. The method of claim 7, wherein said encrypted portion further comprises said second authentication number encrypted in response to said first indicia.

9. The method of claim 8, wherein said encrypted portion further comprises said first indicia encrypted with a private key.

10. The method of claim 1, wherein said first decrypted message is decrypted by said verifier to validate said first computer to said verifier by recovering said third authentication number from said first decrypted message.

11. The method of claim 1, wherein said third message further comprises a third indicia of said user.

12. The method of claim 11, wherein said third indicia and said second authentication number are encrypted with said first authentication number.

13. The method of claim 1, wherein said first communication channel is a confidential communication channel.

14. The method of claim 7, wherein said verifier has tamperproof memory and processing to ensure the validity of said second message or said encrypted portion of said second message.

15. The method of claim 1, wherein said third communication channel is an output device.

16. The method of claim 1, wherein transmitting said second message further comprises the steps of starting a clock by said first computer and measuring a timeout period by said clock therein said timeout period defines the period of time during which said third message must be received by said first computer.

17. The method for authenticating a third device to a first device comprising the steps of:
    encrypting a first key with a second key by said first device;
    transmitting by said first device said encrypted first key to said third device;
    encrypting said second key with a third key by said first device;
    transmitting by said first device said encrypted second key to a second device;

decrypting said encrypted second key in response to obtaining from said first device said third key by a second device; and decrypting by said third device said encrypted first key using said second key obtained from said second device.

18. The method of claim 17 further comprising the step of encrypting said second key with said first key by said third device.

19. The method of claim 18 further comprising the step of decrypting said encrypted second key using said first key by said first device.

20. The method of claim 19 further comprising the step of comparing said second key decrypted using said first key with said second key used to encrypt said first key by said first device.

21. The method for authenticating a third device to a first device comprising the steps of:

transmitting by said first device a first message to said third device;

transmitting by said first device a second message to a second device;

transmitting by said second device a second key of said second message to said third device;

obtaining by said third device a first key of said first message using said second key of said second message; and transmitting by said third device a third message to said first device.

22. The method of claim 21, wherein said first message comprises said first key encrypted by said second key.

23. The method of claim 21, wherein said second message further comprises an encrypted portion.

24. The method of claim 23, wherein said encrypted portion further comprises said second key encrypted by a public key.

25. The method of claim 21, wherein said third message comprises said second key encrypted by said first key.

26. The method of claim 25 further comprising obtaining by said first device said second key of said third message using said first key of said first message.

27. The method of claim 26 further comprising said first device comparing said second key of said third message with said second key of said first message.

28. The method of claim 21, wherein transmitting said second message further comprises the steps of starting a clock by said first device and measuring a timeout period by said clock wherein said timeout period defines the period of time during which said third message must be received by said first device.

29. A system for enabling strong mutual authenticating comprising:

a first transmitter;

a first receiver in communication with said first transmitter;

an output device in communication with said first receiver;

a second receiver in communication with said output device;

a second transmitter; and a comparator in communication with said second transmitter and said first transmitter, wherein said first transmitter transmits a first message to said second receiver over a first communication channel;

wherein said first transmitter transmits a second message to said first receiver over a second communication channel;

wherein said output device transmits a second key derived from said second message to said second receiver over a third communication channel; wherein said second transmitter transmits a third message to said comparator over said first communication channel;

wherein said comparator compares said second key of said third message with said second key of said first message.

30. The system of claim 29, wherein said first receiver further comprises a smart card.

31. The system of claim 30, wherein said smart card comprises a tamperproof storage.

32. The system of claim 31, wherein said smart card further comprises the identification of the positive identity of a user.

33. The system of claim 29, wherein said first transmitter encrypts a first key with said second key to produce said first message.

34. The system of claim 29 wherein said first transmitter constructs an encrypted portion to produce said second message.

35. The system of claim 34, wherein said first transmitter encrypts said second key to produce said encrypted portion.

36. The system of claim 29, wherein said first receiver obtains said second key by decrypting said second message with a public key.

37. The system of claim 36, wherein said first receiver retrieves said public key from its computer memory.

38. The system of claim 29, wherein said second receiver decrypts said first message with said second key received from said output device to obtain said first key.

39. The system of claim 38, wherein said second receiver encrypts said second key received from said output device with said first key of said first message to produce said third message.

40. The system of claim 29, wherein said comparator decrypts said third message to obtain said second key.

41. The system of claim 29, wherein said first communication channel is a confidential channel.

42. The system of claim 29, wherein said second communication channel is a confidential channel.

43. The system of claim 29, wherein said third communication channel is a confidential channel.

44. The system of claim 29, wherein said second communication channel is a cellular communication channel.

45. The system of claim 29 further comprises a first input device in communication with said second receiver and said output device.

46. The system of claim 45, wherein said output device is in communication with said first input device over a confidential communication channel.

47. The system of claim 29, wherein said first transmitter comprises a clock used to measure the time period between transmitting said second message to said first receiver and receiving said third message from said second transmitter.

* * * * *